United States Patent [19]
Sharp

[11] 3,723,764
[45] Mar. 27, 1973

[54] ELECTRICAL CIRCUIT ARRANGEMENTS FOR CONVERTING A VARIABLE RATE OF PULSE TRANSMISSION INTO A RELATED ELECTRICAL OUTPUT QUANTITY

[75] Inventor: Denis Sharp, East Grinstead, England

[73] Assignee: U.S. Philips Corporation, New York, N.Y.

[22] Filed: July 27, 1970

[21] Appl. No.: 58,347

[30] Foreign Application Priority Data

July 25, 1969 Great Britain....................37,576/69

[52] U.S. Cl.....................................307/233, 329/107
[51] Int. Cl...................................................H03k 9/06
[58] Field of Search ......307/233, 317, 237; 328/151, 328/140, 141

[56] References Cited

UNITED STATES PATENTS

| | | | |
|---|---|---|---|
| 2,847,159 | 8/1958 | Curtis | 307/317 |
| 3,351,864 | 11/1967 | Scribner | 307/233 |
| 3,299,295 | 1/1967 | Goda | 307/233 |
| 3,353,035 | 11/1967 | Dent | 307/233 |
| 3,364,431 | 1/1968 | Doble et al. | 307/233 |
| 3,414,770 | 12/1968 | Pudewill | 307/233 |
| 3,448,402 | 6/1969 | Booker, Jr. et al. | 307/233 |
| 3,539,827 | 11/1970 | Crowe | 307/233 |
| 3,575,611 | 4/1971 | Reed | 307/233 |
| 3,586,986 | 6/1971 | Martens et al. | 307/233 |

FOREIGN PATENTS OR APPLICATIONS

| | | | |
|---|---|---|---|
| 1,523,256 | 7/1966 | Germany | 307/233 |
| 722,306 | 7/1962 | Canada | 307/233 |

*Primary Examiner*—Herman Karl Saalbach
*Assistant Examiner*—R. E. Hart
*Attorney*—Frank R. Trifari

[57] ABSTRACT

An input circuit for use with a Frequency-to-DC converter circuit to provide the latter circuit with reset pulses of constant width irrespective of the input pulse frequency. The input circuit includes first and second time constant means, the first of which controls the setting of the second in response to each input pulse. The second provides, when set, a restoration period which defines the duration of a reset pulse to be applied to the Frequency-to-DC converter circuit.

5 Claims, 10 Drawing Figures

INVENTOR.

DENIS SHARP

BY [signature]

AGENT

*INVENTOR.*

DENIS SHARP

*BY*

Frank R. Siofani [signature]

AGENT

PATENTED MAR 27 1973 3,723,764

INVENTOR.

DENIS SHARP

BY

AGENT

INVENTOR.
DENIS SHARP
BY
AGENT

ELECTRICAL CIRCUIT ARRANGEMENTS FOR CONVERTING A VARIABLE RATE OF PULSE TRANSMISSION INTO A RELATED ELECTRICAL OUTPUT QUANTITY

This invention relates to circuit arrangements of the kind suitable for converting a variable rate of pulse transmission into a related electrical output quantity.

In certain circuit arrangements of this kind, part of the conversion process involves the generation of a reset pulse once per cycle of the input. This is the case, for example, for the frequency-to-DC convertor circuit arrangements described in co-pending U.S. Pat. applications Ser. Nos. 858,420 and 58,350. For attaining a desired performance of a circuit arrangement of the above kind, it may be required that the width of the reset pulse should be unaffected by variations in the mark-space ratio of the input frequency. Moreover, when the cyclic time of the input signal becomes equal to or shorter than the pulse width of the reset pulse, it may also be required to produce a continuous reset quantity (voltage).

It is an object of the present invention to provide in or for a circuit arrangement of the above kind an input circuit capable of fulfilling these requirements.

According to the present invention there is provided an input circuit comprising: first time constant means which is responsive to the leading edge of each pulse of an applied train of pulses to change the level of a first control voltage from a first level to a second level and then to commence the restoration of said first control voltage to said first level as a sawtooth at a rate determined by the time constant value of said first time constant means, the latter being further responsive to the trailing edge of each applied pulse to reset said first control voltage to said first level if that level has not been attained yet due to the sawtooth restoration; second time constant means which is responsive to each change of said first control voltage from said first level to said second level to cause a similar change from first to second levels of a second control voltage and then to restore said second control voltage from its second level to its first level as a sawtooth at a rate determined by the time constant value of said second time constant means; and output means responsive to produce an output pulse for the duration of each sawtooth restoration of said second control voltage.

With such an input circuit, the duration of the output pulses produced thereby is determined by the time constant value of the second time constant means so that this duration never varies, even when the frequency of an applied pulse train varies, although the frequency of the output pulses will vary correspondingly. Furthermore, if the cyclic time of an applied pulse train becomes equal to or shorter than the time constant value of said second time constant means, then the output pulses will, in effect, overlap so that a continuous quantity is produced.

The combination of an input circuit according to the invention and a circuit arrangement of the kind referred to has a particular application in anti-lock brake systems for wheeled vehicles, that is, systems including means for improving braking performance of a vehicle by relieving braking pressure applied to a road wheel of the vehicle if the wheel tends to lock on a slippery surface following brake application and then increasing the braking pressure again without the need for any change in the actual braking action by a person using the brake. Such systems can be successful in reducing the risk of skidding due to wheel lock and in maintaining directional control during braking, and can also reduce braking distances.

This application of the combination is in control circuit means of an anti-lock vehicle brake system of the character comprising, for use in conjunction with a vehicle wheel and associated wheel brake, a wheel movement sensor for producing electrical signals related to rotational movement of the wheel, control circuit means which is responsive to said electrical signals to produce an electrical output in dependence on a particular criterion related to wheel rotational movement, and control valve means which is arranged for actuation in response to said electrical output to relieve the braking pressure applied from a fluid pressure source of the system to the wheel brake. A suitable criterion – though not the only one – is when deceleration of the wheel is in excess of a predetermined value.

In this application, the combination is used to provide a voltage of value related to the frequency of a pulse train (constituting said electrical signals) which is generated in response to wheel rotational movement by, for example, magnetic interaction between a ferromagnetic toothed ring rotatable with the wheel and an electromagnetic pick-up which is positioned adjacent to the ring to sense change of flux as each tooth of the ring passes it and is succeeded by a gap when the wheel revolves, said ring and pick-up constituting the wheel movement sensor. The resulting voltage output, which is related to the frequency of the pulse train, can be utilized in the control circuit means for determining when the electrical output from the latter is to be produced for actuating the control valve means. The use of the combination is particularly advantageous in this application because it can maintain an accurate input frequency/output voltage conversion even though the mark-space ratio of the pulse train from the electromagnetic pick-up may vary between wide limits due to variation in wheel speed.

The present invention also provides an anti-lock vehicle brake system of the above character having control circuit means embodying the combination set forth above.

In order that the invention may be more fully understood, reference will now be made by way of example to the accompanying drawings in which:

FIG. 1 shows an input circuit conforming to the invention;

FIG. 2 shows an embodiment of the input circuit of FIG. 1 in combination with a circuit arrangement of the kind referred to;

FIG. 3 is a block diagram of a control circuit means of an anti-lock vehicle brake system of the character referred to;

FIG. 5 is a block diagram of an anti-lock vehicle brake system of the character referred to.

Figures 1, 2:
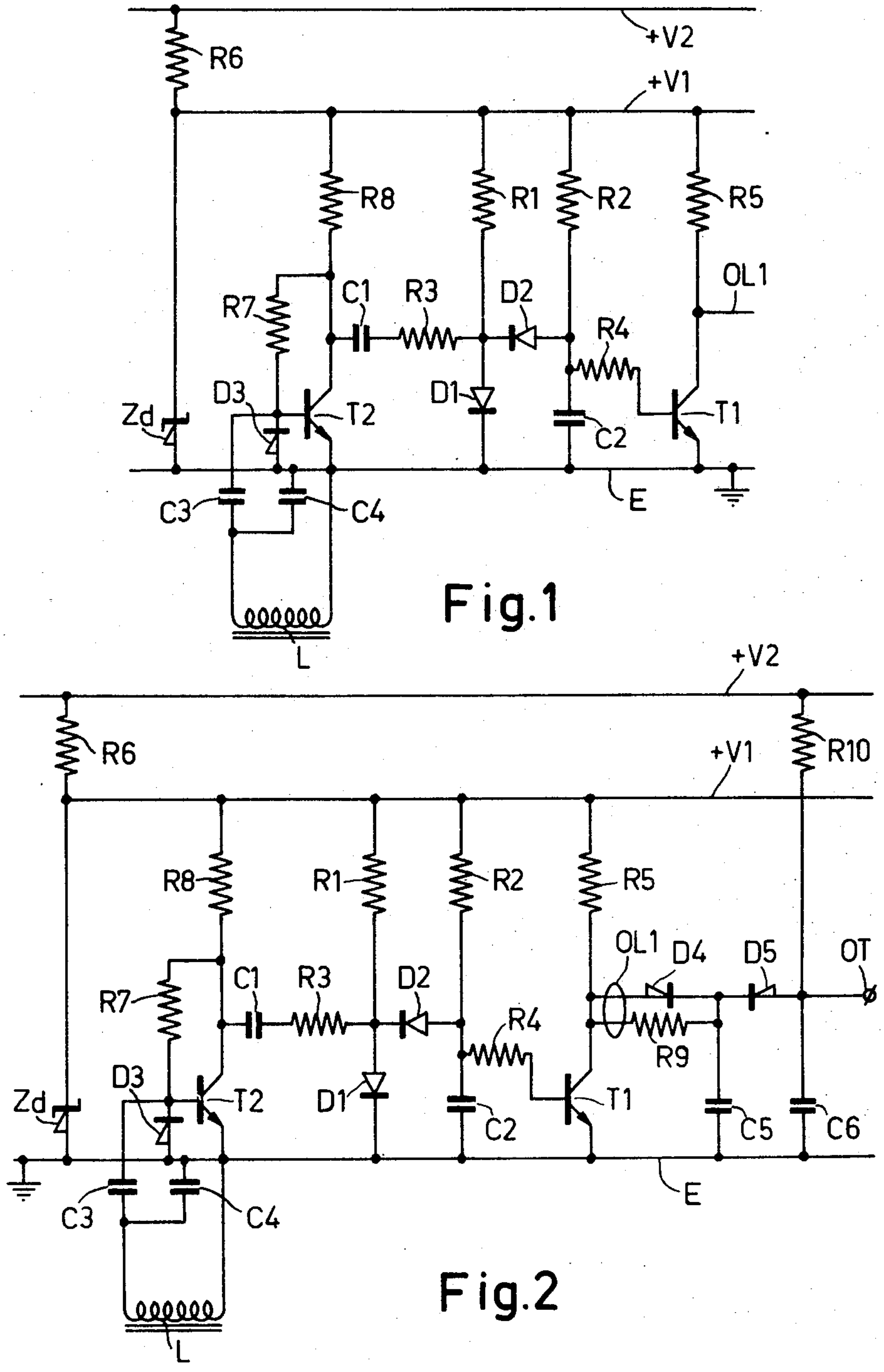

Referring to the drawings, the input circuit shown in FIG. 1 comprises a first time constant circuit formed by a capacitor C1 and a resistor R1, and a second time constant circuit formed by a capacitor C2 and a resistor R2. A resistor R3 is connected in series between the capacitor C1 and the resistor R1 but the value of this resistor R3 is very small compared with the value of the resistor R1 so that its effect on the first time constant circuit is negligible. The junction of the two resistors R1 and R3 is connected to a ground line E for the input circuit via a first diode D1, and also to the junction of the resistor R2 and capacitor C2 via a second diode D2. This latter junction is also connected via a resistor R4 to the base of a transistor T1 which has its emitter connected directly to the ground line E and its collector connected via a collector resistor R5 to a stabilized voltage line +V1. An output lead OL1 is connected to the collector of the transistor T1. The stabilized voltage line +V1 is provided by a Zener diode Zd which is connected in series with a resistor R6 between the ground line E and a supply voltage line +V2.

The capacitor C1 of the input circuit is connected to the collector of a transistor T2 which is arranged in an amplifier and limiter circuit and is operable to produce a square wave output at its collector in response to an alternating input signal produced by an electromagnetic pick-up which is represented only by its output coil L. The alternating input signal is coupled into the base of the transistor T2 via a capacitor C3. A capacitor C4 serves to remove unwanted interference in the output from the output coil L, and a diode D3 serves to prevent the d.c. bias at the base of transistor T2, as provided by a resistor R7 connected between the base and collector of this transistor, from shifting due to rectification of the alternating input signal to the base by the base/emitter diode of the transistor T2. A collector resistor R8 is provided for the transistor T2.

When the circuit is energized by the application of a suitable supply voltage, the transistor T1 is saturated due to the connection of its base to the voltage line +V1 via resistors R2 and R4, and the transistor T2 is biassed at the threshold of conduction. Upon the application of an alternating input signal to the circuit, the resulting square wave output produced at the collector of transistor T2 may be as represented by waveform diagram (*a*), or waveform diagram (*b*), of FIG. 6, depending on the frequency of the alternating input signal. When the transistor T2 is saturated during each positive half cycle of the alternating input signal, the rate of change of current in a negative sense at the collector of transistor T2 (i.e., the leading edge of the resulting square wave output pulse) is reflected through capacitor C1, which is therefore effectively discharged, so that the potential at the junction of resistor R1 and R3 undergoes a rapid change in a negative sense. This causes diode D2 to become forward biased so that the potential at the base of transistor T1 also undergoes a rapid change in a negative sense due to the capacitor C2 discharging through diode D2. As a result the transistor T1 is cut off. Thereafter, the capacitor C1 commences to charge-up through resistor R1 so that the potential at the junction of resistors R1 and R3 is restored towards its original value as a sawtooth function. This potential is represented by the waveform diagram (*c*) of FIG. 6. Also, the capacitor C2 commences to charge-up through resistor R2 so that the potential at the base of transistor T1 is restored as a sawtooth function towards its original value. This potential is represented by the waveform diagram (*d*) of FIG. 6, and when it reaches its original value the transistor T1 is rendered conductive again.

If the time constant value of capacitor C1 and resistor R1 is less than the cyclic time of the alternating input signal, then the potential at the junction of resistors R1 and R3 will restore to its original value as a sawtooth function and remain at that value until the next leading edge of the square wave output pulse produced at the collector of transistor T2. This is indicated by the full line waveform in waveform diagram (*c*) of FIG. 6, in relation to waveform diagram (*a*). However, if this time constant value is less than the cyclic time, then on the occurrence of the trailing edge of the subsisting square wave output pulse, the rate of change of current in a positive sense at the collector of transistor T2 is reflected through capacitor C1 which is therefore effectively charged-up via diode D1, so that the potential at the junction of resistors R1 and R3 is restored by this trailing edge to its original value. This is indicated by the dotted line waveform in waveform diagram (*c*) of FIG. 6, in relation to waveform diagram (*b*). However, the restoration as a sawtooth of the potential at the base of transistor T1 remains unaffected by the sudden change in potential at the junction of resistors R1 and R3, because diode D2 remains back biased. Therefore, the time for which transistor T1 remains non-conductive, and thus the duration of each output pulse at the output lead OL1, as represented by the waveform diagram (*e*) of FIG. 6, remains constant. Of course, the output pulse frequency varies with variation in the frequency of the alternating input signal, as indicated by the dotted line waveforms in waveform diagrams (*d*) and (*e*) of FIG. 6, but the duration of the output pulses is unaffected by variations in the mark-space ratio of the alternating input signal.

It will be appreciated that if the cyclic time of the alternating input signal becomes equal to or shorter than the time constant value of capacitor C2 and resistor R2, then the output pulse will, in effect, overlap so that a continuous output quantity is produced. The time constant value of C1 and R1 is made greater than (or at least equal to) that of C2 and R2 to ensure that D2 remains reverse biased during the two sawtooth restorations to maintain the isolation between them.

FIG. 2 shows the input circuit of FIG. 1 in combination with a frequency-to-DC convertor circuit arrangement of the form described in co-pending U.S. Pat. Application Ser. No. 858,420. For the sake of convenience corresponding components in FIGS. 1 and 2 have been given the same references.

In this combination, the output lead OL1 from the input circuit is connected to one end of the parallel combination of a resistor R9 and a diode D4. The other end of the parallel combination is connected to one side of a capacitor C5, the other side of which is connected to the ground line E. A capacitor C6 is connected in series with a resistor R10 between the ground line E and the positive voltage line +V2. The junction of this capacitor C6 and resistor R10 has an output terminal 0T connected to it, and this junction is also connected via a diode D5 to the common junction of resistor R9, diode D4 and capacitor C5.

The circuit operation of the input circuit is as already described with reference to FIG. 1, and the circuit operation of frequency-to-DC convertor circuit arrangement is as follows:

Each time transistor T1 is cut-off, diode D4 becomes forward biased to complete a charging circuit for the capacitor C5 through this diode and resistor R5 to the positive voltage line +V1. As a result, the voltage across capacitor C5 is effectively re-set once per cycle of an alternating input signal to the voltage of the positive voltage line +V1. During the period of each cycle of the alternating input signal that transistor T1 is conductive, the charge on the capacitor C5 is decaying through resistor R9 and transistor T1 so that the voltage across the capacitor C5 decreases. The extent of this decrease depends upon the time interval between successive occurrences of transistor T1 becoming non-conductive and thus upon the instantaneous frequency of the alternating input signal.

Since the capacitor C6 is permanently connected in series with resistor R10 between the ground line E and the positive voltage line +V2, this capacitor will commence to charge up as soon as the circuit arrangement is energized by the application of suitable supply voltages. However, as soon as the voltage across the capacitor C6 exceeds the voltage across the capacitor C5, the diode D5 becomes forward biassed so that the charge on capacitor C6 decays through diode D5 to or towards the level of the charge on the capacitor C5. Therefore, the value of the voltage across the capacitor C6 tends to follow the value of the voltage across the capacitor C5 as the charge on the latter is decaying, and the value to which the voltage across capacitor C5 has decayed to is stored on the capacitor C6 each time the voltage across the capacitor C5 is re-set. If the frequency of the alternating input signal increases, then the voltage across capacitor C6 increases to a higher value which the voltage across capacitor C5 only has time to decay to, before resetting, because of the shorter time interval between successive occurrences of transistor T1 becoming conductive. Conversely, if the frequency of the alternating input signal decreases, then the voltage across capacitor C5 decreases to a lower value because there is a longer time interval before this voltage is re-set, and the voltage across capacitor C6 is pulled down to this lower level. The voltage across capacitor C6 is the output voltage appearing at the output terminal OT of the arrangement.

As aforesaid, the combination of an input circuit according to the invention and a frequency-to-DC convertor circuit arrangement of the kind previously referred to has application in control circuit means of an anti-lock vehicle brake system of the character referred to, and an example of this application will now be considered.

Figure 3:
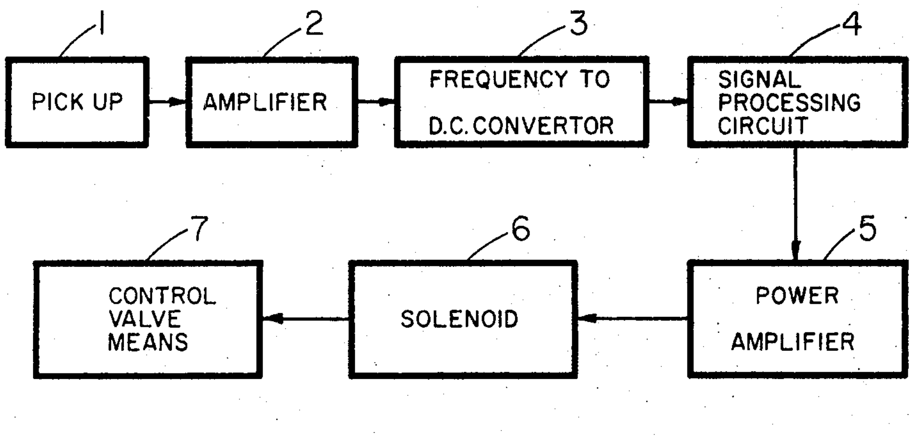

Turning now to FIG. 3, the control circuit means represented by the block diagram there shown is responsive to pulses related to rotational movement of a vehicle wheel. These pulses may be produced by an electromagnetic pick-up 1 which, as aforesaid, is associated with a ferromagnetic toothed ring rotatable with the wheel to sense change of flux as each tooth of the ring passes it and is succeeded by a gap as the wheel revolves. The pulse output from the pick-up 1 is amplified and limited by an amplifier circuit 2 which would comprise a transistor amplifier and limiter circuit, and the resulting square wave output is applied to a frequency-to-DC convertor 3 which is responsive thereto to produce an output voltage of a magnitude related to the frequency of the pulses supplied by the pick-up 1. This output voltage is applied to a signal processing circuit 4 which is responsive to produce an output in dependence on a particular criterion related to wheel rotational movement as signified by the output voltage from the convertor 3. The output from the circuit 4 is amplified by a power amplifier 5, and the output from the power amplifier 5 is utilized to operate a solenoid 6 which is adapted to actuate control valve means 7 of an anti-lock vehicle brake system.

In the circuit diagram of the control circuit means shown in FIG. 4, the pick-up is again represented by only its output coil L as in FIGS. 1 and 2. The pulse output from this pick-up output coil L is coupled into the base of a transistor T*a* via a capacitor C*a*. This transistor T*a* with its other associated components R*a*, C*b*, D*a* and R*b*, comprises the amplifier 2 in FIG. 3, and forms a transistor amplifier and limiter circuit as previously described with reference to FIG. 1.

The output produced at the collector of transistor T*a* is a square wave voltage which is fed to an input circuit according to the invention. This input circuit comprises components C*c*, C*d*, R*c*, R*d*, R*e*, R*f*, D*b*, D*c*, and T*b* and operates as previously described with reference to FIG. 1. The output from the collector of transistor T*b* is applied to a frequency-to-DC convertor circuit arrangement which comprises components R*g*, R*h*, D*d*, D*e*, C*e*, and C*f* and operates as previously described with reference to FIG. 2. This frequency-to-DC convertor circuit arrangement forms the frequency-to-DC convertor 3 of FIG. 3 and produces across capacitor C*f* an output voltage whose value is related to the frequency of the pulse output supplied by the pick-up, and may thus be termed a speed signal as it is directly related to wheel speed. This output voltage (speed signal) across capacitor C*f* is coupled to the base of a normally conductive transistor T*c* via a capacitor C*g* and a resistor R*j*. The value of this capacitor C*g* and the value of a resistor R*k* to which this capacitor is also coupled, determine a selected wheel deceleration at which transistor T*c* and a further normally conductive transistor T*d* are rendered non-conductive in response to the value of speed signal then obtaining. The cut-off of transistors T*c* and T*d* will cause a normally non-conductive transistor T*e* to become conductive. The components C*g*, C*h*, T*c*, T*d*, R*j*, R*k*, R*l* and D*f* comprise the signal processing circuit 4 of FIG. 3. The resistor R*k*, which together with resistor R*j* forms a potential divider in the base circuit of transistor T*c*, provides a current sufficient to drive the base of transistor T*c* with about ten times the current needed to maintain the two transistors T*c* and T*d* normally conductive. Thus the selected wheel deceleration at which transistor T*e* becomes conductive is virtually independent of the gains of the transistors T*c* and T*d*. A resistor R*l* in the collector circuit of transistor T*c* serves to limit the base current of transistor T*d*, and the capacitor C*h* and the resistor R*j* in the base circuit of transistor T*c* makes the circuit insensitive to ripple in the speed signal. The diode D*f* serves to stabilize the base current of the transistor T*c* against temperature changes. A capacitor C*i* serves to prevent spurious oscillation at high frequencies due to the transistors being capable of working up to 80 M/cs.

A transistor T*f* and a further transistor T*g* amplify the output from transistor T*e*. These transistors T*e*, T*f* and T*g* form the power amplifier 5 of FIG. 3. The output from transistor T*g* drives a solenoid S which corresponds to the solenoid 6 in FIG. 3. A diode D*g* serves to clip overshoot voltage on the solenoid S when it is switched off, thereby preventing too high a voltage from being applied to the collector of transistor T*g*.

The circuit parameters would be so chosen that the solenoid would be turned off when the wheel being sensed has accelerated up to the speed it would have doing if it had continued to decelerate from its initial speed, at the instant of braking, at a rate equal to the selected wheel deceleration at which the solenoid was turned on.

It is also arranged that the solenoid S is turned off after a predetermined period, even if the wheel does not re-accelerate after the solenoid S has been turned on. This is achieved by means of capacitor C*g* which in conjunction with resistor R*k* serves as an a.c. coupling to differentiate the speed signal, so that after a certain period of energization of the solenoid, as determined by the time constant of this a.c. coupling, the transistors T*c* and T*d* are rendered conductive again to render transistor T*g* non-conductive to de-energize the solenoid. However, since the capacitor C*g* and resistor R*k* also determine the selected wheel deceleration, the time constant of the a.c. coupling afforded by these components cannot be varied, to vary the period before the solenoid is de-energized in the absence of wheel re-acceleration without also varying the selected wheel deceleration. A separate a.c. coupling which is independent of capacitor C*g* and resistor R*k* suitably comprises a further capacitor connected in the base circuit of transistor T*e*, together with a further resistor connected between this base and the OV line.

Figure 4:
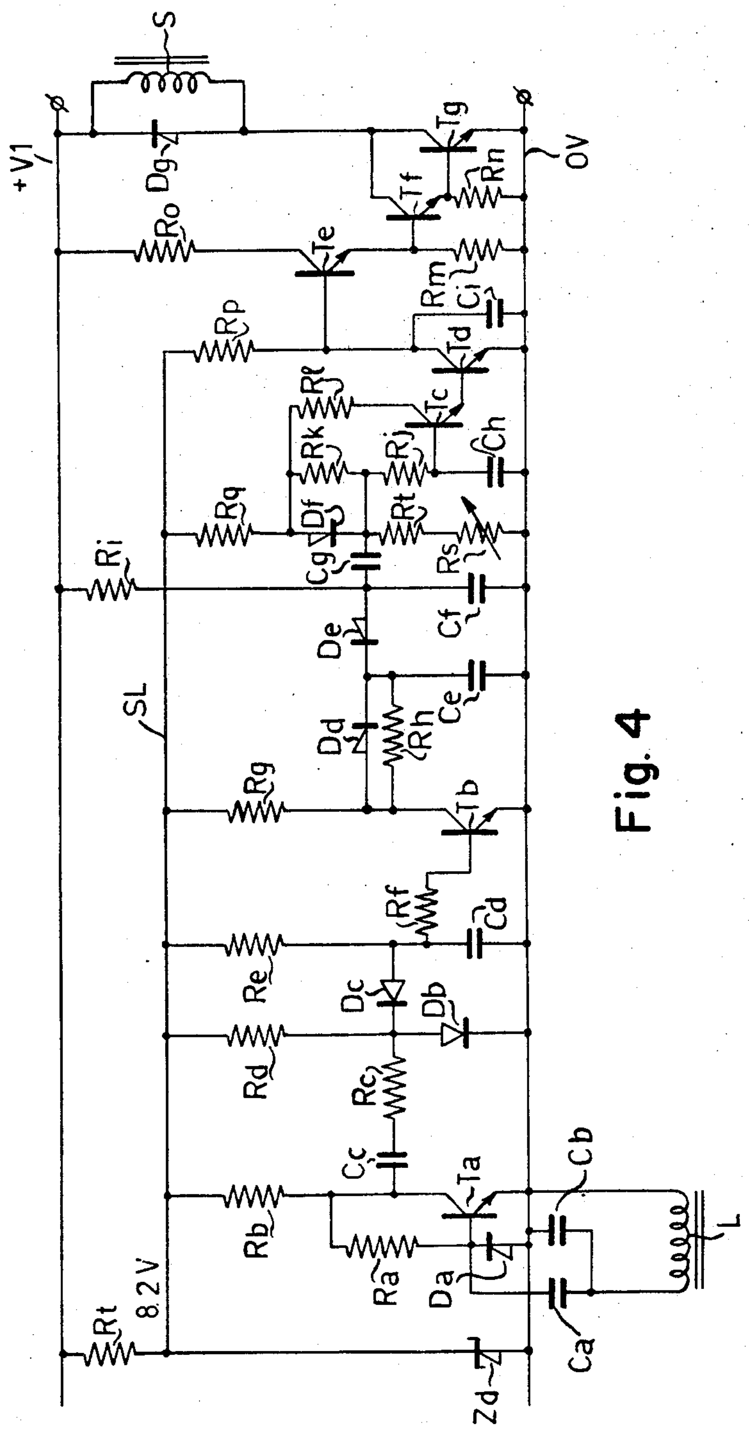
FIG. 4 is a circuit diagram of the control circuit means of FIG. 3.
Figure 6A:
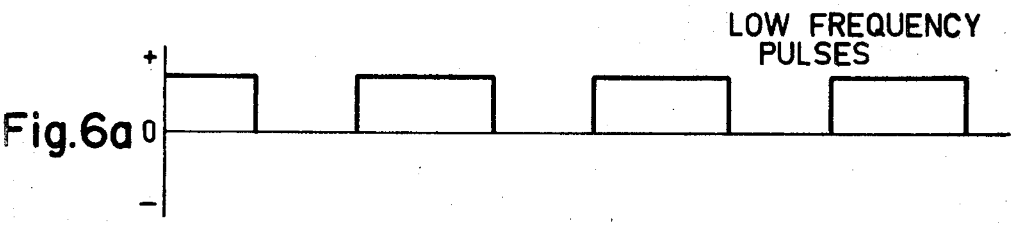
FIG. 6*a–e* shows explanatory waveform diagrams.
Figure 6B:
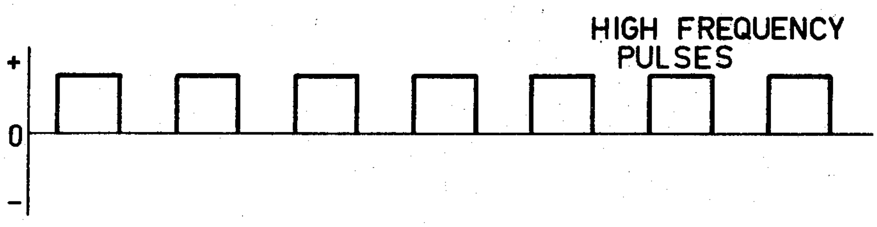
Figure 6C:
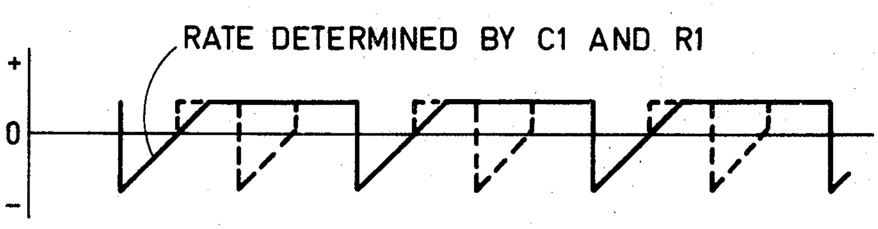
Figure 6D:
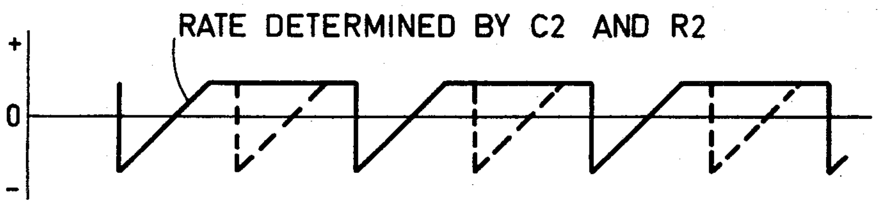
Figure 6E:
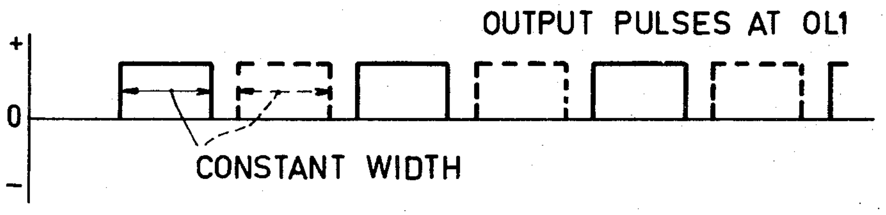

The circuit diagram of FIG. 4 may be modified in that if a capacitor C*g* of larger value and higher gain transistors are used, the transistor T*c* and its collector resistor R*l* can be dispensed with and the junction of resistor R*j* and capacitor C*g* can then be connected directly to the base of transistor T*d*.

In each of the circuits of FIGS. 1, 2 and 4, transistors of opposite type to those shown may be used with suitable adjustment of the voltage supply lines.

Suitable components and component values for the circuit diagram of FIG. 4 are as follows: for a wheel diameter of 2 feet having 60 teeth/revolution on a toothed ring attached thereto, for which a typical output voltage from the magnetic pick-up would be 1 volt peak at 100 cps. (7mph) and 10 volts peak at 1000 cps. (approx. 70mph).

Resistors

| | |
|---|---|
| Ra — 1M ohms | Rj — 33K ohms |
| Rb — 18K ohms | Rk — 470K ohms |
| Rc — 1K ohms | Rl — 470K ohms |
| Rd — 680K ohms | Rm — 10K ohms |
| Re — 330K ohms | Rn — 1K ohms |
| Rf — 1K ohms | Ro — 150 ohms |
| Rg — 3.9K ohms | Rp — 33K ohms |
| Rh — 15K ohms | Rq — 10K ohms |
| Ri — 150K ohms | Rr — 4.7K ohms |
| | Rs — 10K ohms |
| | Rt — 150 ohms |

| Capacitors | Transistors |
|---|---|
| Ca — .22$\mu$F | Ta — type BC 108 (Mullard) |
| Cb — 0.1$\mu$F | Tb " " |
| Cc — .5KpF | Tc " " |
| Cd — 10KpF | Td " " |
| Ce — 0.1$\mu$F | Te " " |
| Cf — 1.0$\mu$F | Tf — BFY 52 " |
| Cg — 1.0$\mu$F | Tg — BDYIO " |
| Ch — 0.1$\mu$F | |
| Ci — 2KpF | |

| Diodes | Voltages |
|---|---|
| Zd — 8.2v zener (Mullard) | +V = 12 volts |
| Da — type OA202" | |
| Db — " " | |
| Dc — " " | |
| Dd — " " | |
| De — " " | |
| Df — " " | |
| Dg — BYZIO " | |

Figure 5:
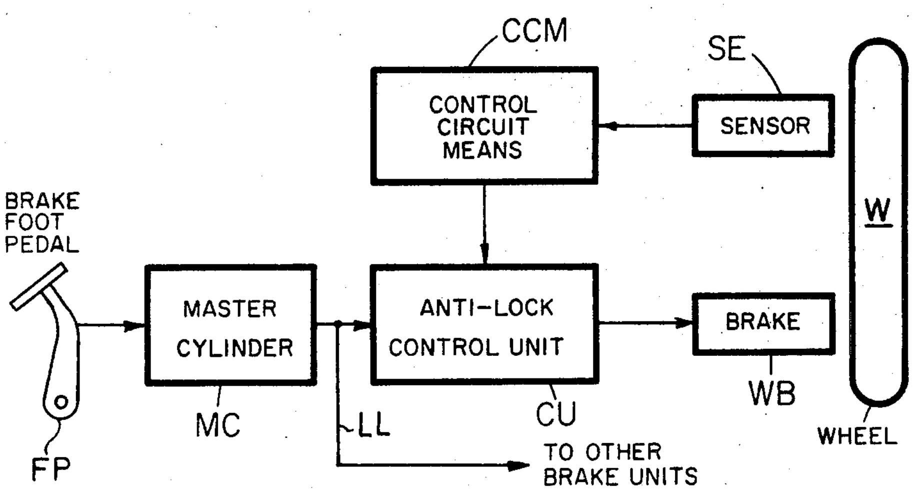

FIG. 5 shows diagrammatically a general layout for an anti-lock vehicle brake system in which the present invention can be embodied. This layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel movement sensor SE applies electrical pulses related to wheel rotational movement to a control circuit means CCM. The anti-lock control unit CU would include control valve means which is arranged for actuation in response to an electrical output from the control circuit means CCM to cause braking pressure applied to the wheel brake WB to be relieved. This system is of the character previously referred to, and in the present instance in which the control circuit means is in accordance with FIGS. 3 and 4, the electrical output would be produced from the control circuit means CCM when the deceleration of the wheel is in excess of a predetermined value. The wheel movement sensor SE would be the pick-up 1, and the solenoid 6 and the control valve means 7 would be included in the anti-lock control unit CU.

As indicated by the lead LL, separate systems as shown in FIG. 5 (with a common fluid pressure source) may be provided in respect of each road wheel of a vehicle, but it would also be possible to provide a single system for two (rear) wheels driven by a vehicle propellor shaft with a sensor associated with the shaft for producing the electrical signals related to wheel rotational movement. As an alternative, a single anti-lock control unit including control valve means may be provided in common for all the road wheels of a vehicle. In this case each road wheel would have its own wheel movement sensor and associated control circuit means, and any of the latter would provide an electrical output to actuate the control valve means when the appertaining wheel tends towards a locked condition.

As alternatives to the particular form of signal processing circuit shown in FIG. 4, any of the signal processing circuits described in co-pending U.S. Pat. Application Ser. No. 884,551 can be used. A control circuit means as thus embodied can be for an anti-lock vehicle brake system as described in co-pending U.S. Pat. Application Ser. No. 881,460.

What I claim is:

1. A circuit for converting a variable frequency pulse train into a proportional voltage comprising, first time constant means responsive to the leading edge of each pulse of an applied train of pulses to change the level of a first control voltage from a first level to a second level and then to allow said first control voltage to return to said first level with a sawtooth waveform at a rate determined by the time constant value of said first time constant means, the latter being further responsive to the trailing edge of each applied pulse to reset said first control voltage to said first level if that level has not yet been attained at the time of occurrence of said trailing edge, second time constant means coupled to the first time constant means and responsive to each change of said first control voltage from said first level to said second level to cause a similar change from first to second levels of a second control voltage and then to restore said second control voltage from its second level to its first level with a sawtooth waveform at a rate determined by the time constant value of said second time constant means, switching means responsive to said second control voltage to produce a train of voltage pulses of constant width determined by the time constant of said second time constant means, a first capacitor coupled to the output of the switching means via a first diode and to a source of voltage such that the switching means causes the first capacitor to charge up to a predetermined voltage level for each voltage pulse received, a discharge circuit for said first capacitor that includes the switching means, and a second capacitor connected to a source of charge current and to said first capacitor via a second diode poled to prevent the discharge of said first capacitor into the second capacitor thereby to develop across said second capacitor a voltage that is proportional to the frequency of said applied train of pulses.

2. A circuit as claimed in claim 1, wherein said first time constant means comprises a third capacitor and a first resistor connected in series in a first charging circuit, means connecting said third capacitor between an input transistor and a third diode in a manner such that it is discharged in response to the leading edge of each pulse applied to it from said input transistor and is charged up via said third diode, and independently of said first charging circuit, in response to the trailing edge of each said pulse, and wherein said second time constant means comprises a fourth capacitor and a second resistor connected in series in a second charging circuit, means for interconnecting the respective junctions of said third capacitor and first resistor and said fourth capacitor and second resistor via a fourth diode which is so poled as to be forward biassed only momentarily when said third capacitor is discharged in response to said leading edge to permit said fourth capacitor to discharge through it, said fourth diode being otherwise reverse biased due to the respective voltages at opposite sides of it as determined by said first and second time constant values, the switching means further including an output transistor which is responsive to the second control voltage to produce said constant width voltage pulse for the period that said fourth capacitor is recharged following its discharge through said fourth diode.

3. A circuit as claimed in claim 1 wherein the time constant value of said first time constant means is less than or at most equal to the time constant value of said second time constant means.

4. A circuit as claimed in claim 1 wherein said first time constant means comprises a first resistor and a third capacitor serially connected to a source of DC voltage and said second time constant means comprises a second resistor and a fourth capacitor serially connected to a source of DC voltage, a third diode connected between the junction of said first resistor and said third capacitor and one terminal of said DC voltage source, and a fourth diode connected between said junction and the junction of said second resistor and said fourth capacitor.

5. A circuit as claimed in claim 4 wherein said third and fourth diodes are poled with like polarity between the junction of the second resistor and the fourth capacitor and said one terminal of the DC voltage source.

* * * * *